Feb. 27, 1962     R. H. ARMACOST     3,022,685

CERAMIC DRILL BUSHING

Filed April 23, 1958

INVENTOR.
ROBERT H. ARMACOST
BY
Beehler & Shanahan
ATTORNEYS.

United States Patent Office 3,022,685
Patented Feb. 27, 1962

3,022,685
CERAMIC DRILL BUSHING
Robert H. Armacost, Los Angeles, Calif., assignor, by mesne assignments, to American Drill Bushing Co., a corporation of Maryland
Filed Apr. 23, 1958, Ser. No. 730,410
6 Claims. (Cl. 77—62)

The invention relates to drill bushings and has special reference to the method of making a drill bushing from ceramic material to take the place of bushings heretofore made of steel or perhaps of carbide material.

Hardened steel has long been recognized as a standard material for the construction of drill bushings. It will be appreciated that drill bushings are guides normally mounted in a block of appropriate material at precisely located points to enable a drill to be inserted through the bushing so as to perforate a work piece at a precisely selected point. Hardened steel has heretofore seen almost universally used because drill bushings need to stand a considerable amount of use before they begin to show wear enough to cause inaccuracies in the location of the drilled hole. As demands for still greater precision have increased, the useful life of conventional drill bushings made of steel has diminished.

In an effort to substitute drill bushings of longer life for high precision work, a material has been substituted for steel which is commonly identified as carbide material, namely, a metallic sintered tungsten carbide which is extremely hard and wear-resistant. Although such carbide drill bushings do in fact enjoy a much longer life than the more common steel bushings, the carbide bushings are very costly and warrant use only where the type of operation can support use of a drill bushing five to ten times more expensive than commercial drill bushings of the more usual sort.

It is therefore among the objects of the invention to provide a new and improved drill bushing which has an extremely long life, which is at least as accurate and readily handled as currently available drill bushings, and which furthermore is sufficiently inexpensive to warrant a widespread use under virtually all conditions.

Another object of the invention is to provide a new and improved low-cost, long-life drill bushing which can be constructed with an extreme degree of accuracy and moreover which is of such character that it can be made in a form suitable for use with drill blocks of a great variety of materials.

Still another object of the invention is to provide a new and improved method of constructing a low-cost, long-life drill bushing and drill jig which makes use of a ceramic material for forming the drill bushing in successive steps prior to installation in an appropriate drill block.

Still another object of the invention is to provide a new and improved drill bushing of such character that it is affected by high temperatures to a very minor degree and which is also non-magnetic and non-corrosive.

With these and other objects in view, the invention consists in the construction, arrangement and combination of the various parts of the device together with the method for achieving the same whereby the objects contemplated are attained, as hereinafter set forth, pointed out in the appended claims and illustrated in the accompanying drawings.

Figures 1, 1A:
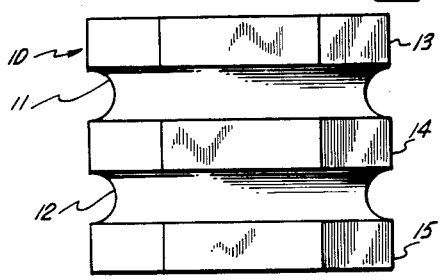
FIGURE 1 is a side elevational view of one form of ceramic drill bushing.
FIGURE 1a is a top view of the drill bushing of FIGURE 1.
Figure 2:
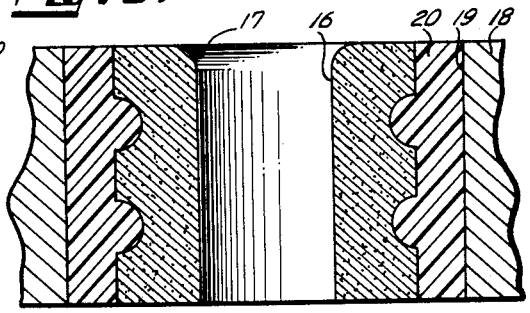
FIGURE 2 is a longitudinal sectional view of a drill bushing of the type shown in FIGURE 1 embedded in an appropriate drill block.

In an embodiment of the invention chosen for the purpose of illustrating both the method and products resulting therefrom there is shown in FIGURE 1 a ceramic drill bushing having a body 10 which is substantially a hexagonal shaped cylinder which on its exterior circumference is provided with spaced annular depressions 11 and 12 which separate the exterior into a series of ridges 13, 14 and 15 separated by the depressions. These ridges in the form of FIGURE 1 have a hexagonal shape. Extending through the center of the body is a drill passage 16 which has a tapered or chamfered entrance 17 to facilitate directing a conventional twist drill through the bushing. The bushing more particularly is of ceramic material of an extremely hard character. An appropriate ceramic material is one of predominantly aluminum oxide compounded with other oxides and formed by a succession of steps which includes the compacting of the initially mixed materials so as to result in a ceramic drill bushing body which is extremely dense as well as hard.

In the forming of the drill bushing aluminum oxide is customarily made into a paste together with several additional oxides, namely, silicon dioxide ($SiO_2$), magnesium oxide ($MgO$), calcium oxide ($CaO$), and chromium sesquioxide ($Cr_2O_3$). A satisfactory mixture is one wherein the aluminum oxide ($Al_2O_3$) is present in quantity of about 95% with the balance of solids comprising the remaining approximately 5%.

The paste is molded into substantially the final form of the drill bushing, whatever that form may be. There is, however, a substantial allowance in the inside and outside dimensions to provide for a machining operation in one of the intervening steps.

The molded drill bushing is first partially fired to form a bisque. The bisque which results from this step is machinable. Accordingly, the passage 16 is drilled to desired size and the exterior portions are machined and ground. The bevel at the entrance end is made during this step. In selecting the size of the bushing, both with respect to the passage therethrough and the exterior size, allowance is made for shrinkage which will occur during the next firing step.

The mold after machining is then fired in accordance with recognized technique known to those skilled in the art of the firing of oxide materials. The final firing causes an appreciable shrinkage chiefly in the exterior dimension which is the shrinkage allowed for when the molded bisque is machined.

In the initial machining and molding there is a still further allowance of some meager amount of material on both the exterior and in the passage to enable the final sizing of the bushing to be established by diamond honing. It is found feasible to hone both inside and outside diameters to within a few thousandths of the desired size. The inside variation may be from .0002 to about .0005. On the outside the tolerance may be up to about .0004 and in most instances, especially where the drill bushing is to be mounted in a drill block by means of a press fit, the outside diameter will be oversized by approximately .001.

It will be appreciated further that in view of the final diamond honing step and the rather minor amount of shrinkage at the inside diameter of the passage 16, the passage may be molded without a sizing step being necessary while the mold is in bisque form and the final diamond honing depended upon to reduced the size of the passage to the finally desired diameter.

It is found that drill bushings of ceramic material made in accordance with the method made reference to will have properties highly desired in a drill bushing useful for precision drilling over long periods of time. The tensile strength will be about 28,000, the compression strength about 400,000, and softening temperature about 1,750° C. The material thus formed has a very small pore volume of appreciably less than 1%.

It is further to be noted that the thermal expansion will vary from about $5.9 \times 10^{-6}$ to about $8.00 + 10^{-6}$.

The hardness will be in excess of 9 on Mohs scale of which the hardness of diamond is 10. The water absorption will be nil and the resistance to thermal shocks at temperatures as high as 1800° F. will be negligible.

Because of the ceramic character of the material, the resulting drill bushing will be non-magnetic, non-sparking, and is clearly of a character such that being non-metallic, it will experience no corrosion. The non-metallic character also inhibits the setting up of any electrolytic action between the drill bushing and a drill block, should the drill block be metallic, because of the material of the bushing being a dielectric.

The drill bushing comprising the body 10 of FIGURE 1 is one especially well suited to installation in a plastic drill block 18. An effective means of setting the drill bushing in a plastic drill block is to form a hole 19 in the drill block appreciably larger than the exterior circumference of the bushing. The bushing is then approximately centered within the hole by use of conventional pins located properly in a pattern. Thus located, a mass of potting plastic 20 is then poured into the space between the exterior of the drill block and the wall of the hole 19 and permitted to harden, thus firmly setting the drill bushing in place.

Figure 3:
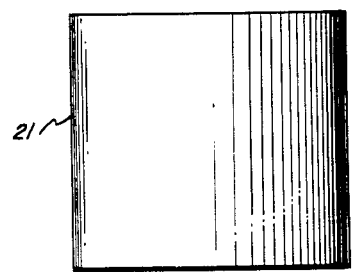
FIGURE 3 is a side elevational view of another form of ceramic drill bushing.
Figure 4:
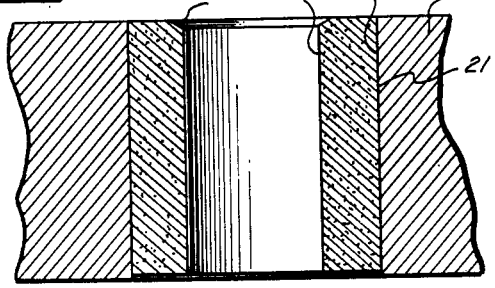
FIGURE 4 is a longitudinal sectional view showing the bushing of FIGURE 3 mounted in a drill block.

In the form of invention of FIGURES 3 and 4, the drill bushing has a body 21 which is a smooth cylinder on the outside and is provided with a passage 22 on the inside for a twist drill. Here, too, a beveled or chamfered entrance 23 is provided during the machining step when the drill bushing still has the bisque form and consistency. In this form of the device the outside diameter of the body 21 is first machined and later honed to a size about .001 larger than a hole 24 in a metal drill block 25. With this relationship of sizes the body can be pressed into the hole in accordance with customary techniques without compressing the passage 22 to an amount which will exceed the greatest allowable tolerance.

Figure 5:
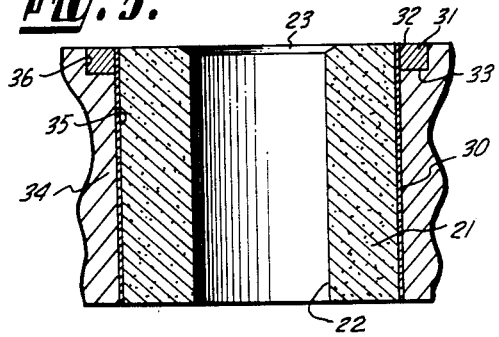
FIGURE 5 is a longitudinal sectional view of a third modified form of drill bushing showing a composite bushing partially formed of ceramic material.
Figure 6:
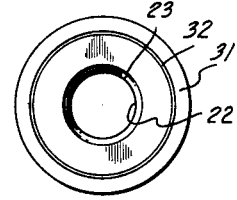
FIGURE 6 is a plan view of the bushing of FIGURE 5.
Figure 8:
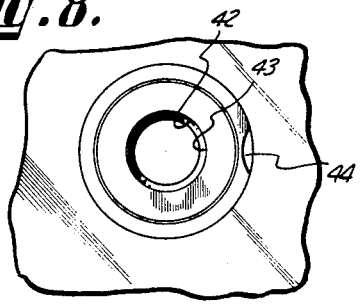
FIGURE 8 is a plan view of the drill bushing of FIGURE 7.
Figure 7:
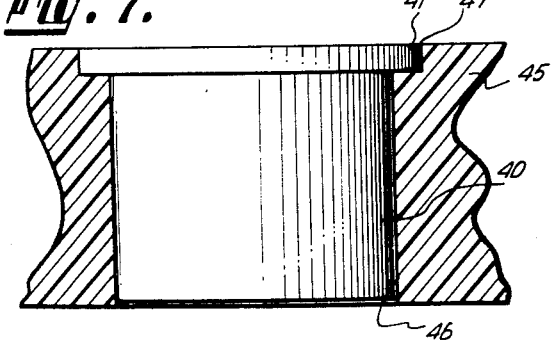
FIGURE 7 is a longitudinal sectional view of a frament of drill block showing still another modified form of drill bushing embedded therein.

In the form of device illustrated in FIGURES 5 and 6, a drill bushing having a body 21 is subjected to a step facilitating the deposit of a metallized spray film 30 on the exterior. After the metallized film has been sprayed and set thereon, an annular ring 31 of appropriate metal is secured to one end of the body as by means of welding to the film 30 at a joint 32. The ring forms a shoulder 33 so that when a drill block 34 is formed with a hole 35 and recess 36 of proper size, the composite drill bushing thus formed can be pressed into place until the ring is received properly within the recess 36. Although the beveled entrance 23 is shown adjacent the end at which the ring 31 is secured, it will be appreciated that should occasion require, the ring may be secured to the opposite end of the bushing.

Because of the character of the ceramic material of which the drill bushing is made, a drill bushing having a body 40 of substantially smooth cylindrical exterior shape may have molded at one end thereof an annular flange 41 of the same material as the body. The molding will follow the steps heretofore described in that allowance will be made for a machining step while the mold is in bisque form so that the flange can be properly formed and sized. A drill passage 42 and beveled entrance 43 may be formed during the initial molding step, as may also be a cut-out 44.

The form of device last described is effective for installation in a plastic drill block 45. Used in this manner a hole 46 may be formed in the plastic slightly smaller than the outside circumference of the body 40 by several thousandths of an inch. A recess 47 will also be initially formed either by molding or machining. The drill bushing is then pressed into the hole 46 so as to be firmly embedded in the plastic.

It will be appreciated particularly that when drill bushings of the ceramic material herein described are to be used with plastic drill blocks either as shown in FIGURES 1 and 2 or FIGURES 7 and 8, extremely long-wearing bushings will be capable of extending the life of plastic drill blocks forming the drill jigs by an exceedingly great amount. On those tests which have been made heretofore, drill bushings of the ceramic material herein shown and described have been operated fifty times longer than comparable steel bushings and measurements after the test have indicated no measurable wear. As many as 1000 holes have been made in material such as aluminum sand casting, under which circumstances tests showed no measurable wear, these tests having been made with an air gage of more than average sensitivity.

There has accordingly been described herein a method of forming a drill bushing of ceramic material in such fashion that the dimensions of the drill bushing can be held to any desired amount, thereby producing a drill bushing of a type readily adapted to combination with a drill block of either plastic or metal to form a long-wearing drill jig of such character that it far outlasts all commercially available types of drill jigs heretofore designed.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and methods.

Having described my invention, what I claim as new and desire to secure by Letters Patent is:

1. A non-metallic drill bushing comprising a body having a substantially cylindrical form and a concentric drill passage of circular cross-section extending therethrough, the body having a bevelled edge formed therein at an inlet end of said passage, the walls respectively of said body and said drill passage having surfaces reduced to size by mechanical working, said body comprising a compacted double fired ceramic material consisting of about 95% by weight of aluminum oxide and about 5% by weight of a plurality of other metal oxides.

2. A non-metallic drill bushing comprising a body having a substantially cylindrical exterior and a drill passage of circular cross-section extending therethrough concentric with said exterior, the body having a bevelled edge formed therein at an inlet end of said passage, the walls respectively of said exterior and said drill passage having diamond honed surfaces, said body comprising a compacted double fired ceramic material of a predominant quantity of about 95% aluminum oxide and the balance of small amounts of a plurality of oxides selected from a group consisting of silicon, magnesium, calcium and chromium.

3. A drill bushing according to claim 2 in which said body has an annular bead of substantially rectangular cross-section at one end thereof integral with the material of said body.

4. A drill bushing according to claim 2 in which said exterior has a sprayed metallic surface and an annular metallic ring welded to said metallic surface at one end of the body whereby to form a shoulder.

5. A drill bushing according to claim 2 in which said exterior has a plurality of axially spaced annular depressions separating a plurality of spaced non-circular ridges therebetween.

6. A drill jig comprising a plate of relatively firm dense metallic material having a hole extending therethrough, a bushing of compacted double fired ceramic material having a hardness of over 9 on the Mohs scale, a thermal conductive rate of about .02, a water absorption characteristic of about zero and a coefficient of thermal expansion of between about $5.9 \times 10^{-6}$ and $7.98 \times 10^{-6}$, said ceramic material consisting of about 95% by weight of aluminum oxide and about 5% by weight of oxides selected from a group consisting of silicon, magnesium, calcium and chromium, said bushing being of a size such that prior to being fitted in said hole the outside diameter of the bushing is about .001 inch greater than the diameter of said hole without the bushing whereby a tight retentive grip is maintained between the plate and said bushing, the exterior of said bushing and in contact with the wall of the hole, and an annular metal flange at one end of the bushing being a thin film of metal integrally bonded to said film of metal and forming a shoulder on the bushing adapted to engage the material of said plate at one surface thereof.

References Cited in the file of this patent

UNITED STATES PATENTS

| | | |
|---|---|---|
| 1,808,047 | Littleton et al. | June 2, 1931 |
| 2,372,485 | Griffin | Mar. 27, 1945 |
| 2,392,804 | Basolo | Jan. 15, 1946 |
| 2,482,580 | Feichter | Sept. 20, 1949 |
| 2,698,547 | Armacost | Jan. 4, 1955 |
| 2,728,249 | Stein et al. | Dec. 27, 1955 |

OTHER REFERENCES

"Ace Drill Bushings" advertisement, copyright 1958, 2 pages. Copy available in Div. 58.